United States Patent
Imashiro et al.

(10) Patent No.: US 11,214,485 B2
(45) Date of Patent: Jan. 4, 2022

(54) CARBON MATERIAL, AND METHOD RELATING TO SAME

(71) Applicants: NISSHINBO HOLDINGS INC., Tokyo (JP); NATIONAL UNIVERSITY CORPORATION GUNMA UNIVERSITY, Maebashi (JP)

(72) Inventors: Yasuo Imashiro, Chiba (JP); Rieko Kobayashi, Chiba (JP); Noriko Osuga, Chiba (JP); Jun-ichi Ozaki, Kiryu (JP); Hirotaka Kujirai, Kawasaki (JP); Setsura Kobayashi, Kawasaki (JP)

(73) Assignees: NISSHINBO HOLDINGS INC., Tokyo (JP); NATIONAL UNIVERSITY CORPORATION GUNMA UNIVERSITY, Maebashi (JP)

( * ) Notice: Subject to any disclaimer, the term of this patent is extended or adjusted under 35 U.S.C. 154(b) by 96 days.

(21) Appl. No.: 15/531,611

(22) PCT Filed: Nov. 30, 2015

(86) PCT No.: PCT/JP2015/083612
§ 371 (c)(1),
(2) Date: May 30, 2017

(87) PCT Pub. No.: WO2016/088715
PCT Pub. Date: Jun. 9, 2016

(65) Prior Publication Data
US 2018/0282156 A1    Oct. 4, 2018

(30) Foreign Application Priority Data
Dec. 5, 2014 (JP) .............................. JP2014-246814

(51) Int. Cl.
C01B 3/00 (2006.01)
B01J 20/20 (2006.01)
(Continued)

(52) U.S. Cl.
CPC ............ C01B 3/0021 (2013.01); B01J 20/20 (2013.01); B01J 20/28057 (2013.01);
(Continued)

(58) Field of Classification Search
CPC ..... C01B 3/0021; C01B 32/318; C01B 32/05; B01J 20/28061; B01J 20/28071;
(Continued)

(56) References Cited

U.S. PATENT DOCUMENTS 5,093,214 A    3/1992  Saito et al.
2003/0031620 A1    2/2003  Harutyunyan et al.
(Continued)

FOREIGN PATENT DOCUMENTS

CN    101375449 A    2/2009
CN    102770371 A    11/2012
(Continued)

OTHER PUBLICATIONS

Hu et al. "Ultrafine microporous and mesoporous activated carbon fibers from alkali lignin"J. Mater. Chem. A, 2013, 1, 11279-11288 (Year: 2013).*

(Continued)

Primary Examiner — Anthony J Zimmer
Assistant Examiner — Syed T Iqbal
(74) Attorney, Agent, or Firm — Oliff PLC

(57) ABSTRACT

A carbon material that is compact and exhibits an excellent hydrogen storage capacity. A carbon material has a specific
(Continued)

surface area of 200 m²/g or less and exhibits a hydrogen storage capacity of $1.5 \times 10^{-5}$ g/m² or more at a hydrogen pressure of 10 MPa.

7 Claims, 5 Drawing Sheets

(51) Int. Cl.
 *B01J 20/28* (2006.01)
 *B01J 20/30* (2006.01)
 *C01B 32/05* (2017.01)
 *C01B 32/318* (2017.01)

(52) U.S. Cl.
 CPC ... *B01J 20/28061* (2013.01); *B01J 20/28071* (2013.01); *B01J 20/3078* (2013.01); *C01B 32/05* (2017.08); *C01B 32/318* (2017.08); *C01P 2006/12* (2013.01); *C01P 2006/14* (2013.01); *C01P 2006/80* (2013.01); *C01P 2006/90* (2013.01); *Y02E 60/32* (2013.01)

(58) Field of Classification Search
 CPC .. B01J 20/28057; B01J 20/3078; B01J 20/20; Y02E 60/325; Y02E 60/327; Y02E 60/328; Y02E 60/32; C01P 2006/90; C01P 2006/80; C01P 2006/14; C01P 2006/12
 See application file for complete search history.

(56) References Cited

U.S. PATENT DOCUMENTS

| | | | |
|---|---|---|---|
| 2007/0292732 A1* | 12/2007 | Feaver | B82Y 30/00 429/421 |
| 2008/0300131 A1* | 12/2008 | Bandosz | B01D 53/02 502/400 |
| 2011/0053765 A1 | 3/2011 | Feaver et al. | |
| 2011/0190118 A1* | 8/2011 | Schulz | B01J 21/063 502/185 |
| 2012/0313053 A1* | 12/2012 | Fujii | B82Y 30/00 252/506 |

FOREIGN PATENT DOCUMENTS

| | | |
|---|---|---|
| CN | 103250283 A | 8/2013 |
| EP | 2 540 665 A1 | 1/2013 |
| JP | H02-152167 A | 6/1990 |
| JP | 2003-038953 A | 2/2003 |
| JP | 2003-246673 A | 9/2003 |
| JP | 2005-000752 A | 1/2005 |
| JP | 2005-505481 A | 2/2005 |
| JP | 2010-275140 A | 12/2010 |
| WO | 02/083556 A2 | 10/2002 |

OTHER PUBLICATIONS

May 14, 2018 Extended Search Report issued in European Patent Application No. 15865283.4.
Feb. 9, 2016 International Search Report issued in International Patent Application No. PCT/JP2015/083612.
Jan. 9, 2019 Office Action issued in Chinese Patent Application No. 201580066022.0.
Mar. 5, 2020 Office Action issued in Chinese Patent Application No. 201580066022.0.
Oertel,G., "Polyurethane Handbook", China Petrochemical Press, pp. 61-68 (Sep. 1992).

* cited by examiner

FIG.1A

| SAMPLE | | RAW MATERIAL | | | CHARACTERISTICS | | | | | |
|---|---|---|---|---|---|---|---|---|---|---|
| | COMPOUND FORMING MAIN CHAIN | POLY-MERI-ZATION DEGREE | SEALING AGENT FORMING TERMINAL GROUP | | HYDROGEN STORAGE AMOUNT | | SPECIFIC SURFACE AREA ($m^2/g$) | TOTAL PORE VOLUME ($cm^3/g$) | TOTAL MESOPORE VOLUME ($cm^3/g$) | TOTAL MICROPORE VOLUME ($cm^3/g$) | N/C |
| | | | KIND | MOLAR MASS (g/mol) | ($\times 10^{-5}$ g/m$^2$) | (wt%) | | | | | |
| EXAMPLE 1 | NAPHTHYLENE DIISOCYANATE (NDI) | 4 | METHANOL | 32.04 | 180.00 | 0.18 | 1 | — | — | — | 0.064 |
| EXAMPLE 2 | TOLYLENE DIISOCYANATE (TDI) | 4 | METHANOL | 32.04 | 7.67 | 0.23 | 30 | — | — | — | 0.064 |
| EXAMPLE 3 | XYLYLENE DIISOCYANATE (XDI) | 4 | METHANOL | 32.04 | 1.94 | 0.31 | 160 | — | — | — | 0.040 |
| EXAMPLE 4 | DIPHENYLMETHANE DIISOCYANATE (MDI) | 4 | METHANOL | 32.04 | 5.20 | 0.26 | 50 | — | — | — | 0.045 |
| EXAMPLE 5 | TOLIDINE DIISOCYANATE (TODI) | 4 | METHANOL | 32.04 | 4.83 | 0.29 | 60 | — | — | — | 0.044 |
| EXAMPLE 6 | TOLYLENE DIISOCYANATE (TDI) | 13 | PHENYL ISOCYANATE | 119.12 | 12.55 | 0.12 | 10 | 0.006 | 0.003 | 0.003 | 0.052 |
| EXAMPLE 7 | TOLYLENE DIISOCYANATE (TDI) | 13 | OCTANOL | 130.23 | 3.05 | 0.21 | 67 | 0.030 | 0.002 | 0.025 | 0.046 |
| EXAMPLE 8 | TOLYLENE DIISOCYANATE (TDI) | 13 | OLEYL ALCOHOL | 268.48 | 4.50 | 0.23 | 51 | 0.020 | 0.003 | 0.018 | 0.062 |
| EXAMPLE 9 | TOLYLENE DIISOCYANATE (TDI) | 13 | DODECYL ALCOHOL | 186.34 | 3.28 | 0.21 | 63 | 0.030 | 0.003 | 0.023 | 0.053 |
| EXAMPLE 10 | TOLYLENE DIISOCYANATE (TDI) | 13 | POLYETHYLENE GLYCOL METHYL ETHER | 400.00 | 4.06 | 0.16 | 39 | 0.020 | 0.003 | 0.014 | 0.053 |

FIG.1B

| SAMPLE | | HYDROGEN STORAGE AMOUNT (×10⁻⁵ g/m²) | (wt%) | CHARACTERISTICS ||||| 
|---|---|---|---|---|---|---|---|---|
| | | | | SPECIFIC SURFACE AREA (m²/g) | TOTAL PORE VOLUME (cm³/g) | TOTAL MESOPORE VOLUME (cm³/g) | TOTAL MICROPORE VOLUME (cm³/g) | N/C |
| COMPARATIVE EXAMPLE | 1 | 0.81 | 0.29 | 358 | 0.550 | 0.420 | 0.050 | 0.028 |
| | 2 | 0.79 | 0.33 | 425 | 0.660 | 0.530 | 0.060 | 0.031 |
| | 3 | 0.82 | 0.28 | 341 | 0.460 | 0.300 | 0.080 | 0.038 |
| | 4 | 0.81 | 0.32 | 396 | 0.580 | 0.400 | 0.090 | 0.039 |
| | 5 | 0.27 | 0.77 | 2870 | 1.850 | 0.710 | 1.130 | — |
| | 6 | 0.60 | 0.28 | 467 | 0.190 | 0.019 | 0.170 | — |
| | 7 | 0.73 | 0.22 | 301 | 1.040 | 0.810 | 0.089 | — |
| | 8 | 0.35 | 0.44 | 1242 | 2.080 | 1.550 | 0.100 | 0.000 |

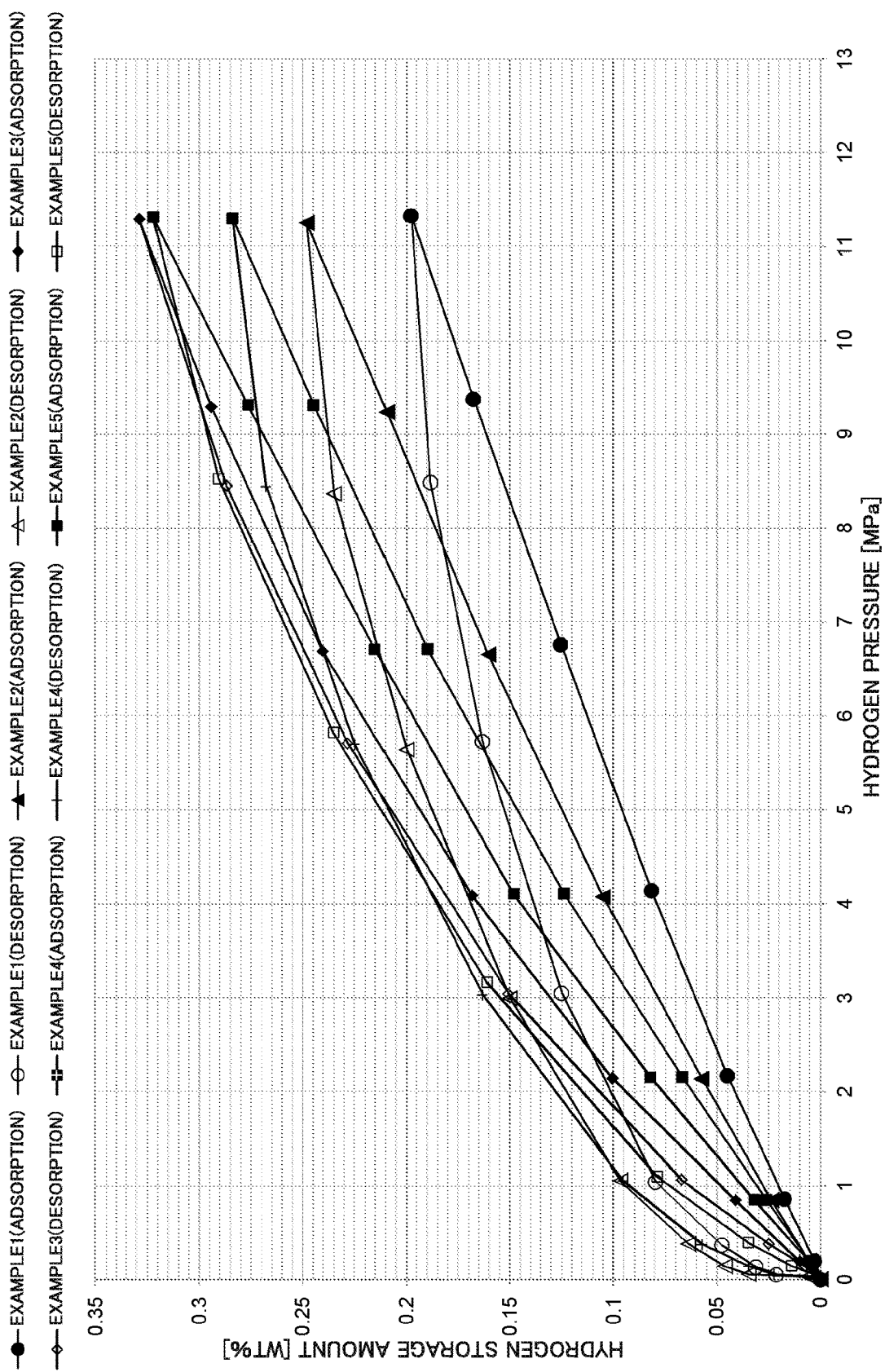

CARBON MATERIAL, AND METHOD RELATING TO SAME

TECHNICAL FIELD

The present invention relates to a carbon material, and more particularly, to a carbon material that exhibits a hydrogen storage capacity.

BACKGROUND ART

Hydrogen is drawing attention as a clean energy source that does not generate carbon dioxide even when burnt. Therefore, in order to use hydrogen as fuel, a method of storing and transporting hydrogen has been investigated.

As the method of storing and transporting hydrogen, a method using a high-pressure gas cylinder is generally used. However, the gas cylinder has a drawback that it is heavy. Further, the storage efficiency per unit volume of the gas cylinder has a practical limit, and hence a significant increase in storage efficiency thereof cannot be expected.

Meanwhile, as a method of storing hydrogen, which replaces the gas cylinder, for example, a method using a hydrogen storage alloy has been known. However, the hydrogen storage alloy has a drawback that the hydrogen storage alloy itself is heavy. Therefore, there is a demand for development of a material which is more lightweight than the hydrogen storage alloy and which exhibits a high hydrogen storage capacity.

In this respect, in recent years, carbon materials, for example, a carbon nanotube, a carbon nanofiber, and an activated carbon have drawn attention as materials that are lightweight and can store hydrogen, and a use of those materials as hydrogen storage materials has been investigated.

Specifically, for example, in Patent Literature 1, there is disclosed a hydrogen storage body that contains a carbon material having a specific surface area of 1,000 $m^2/g$ or more.

CITATION LIST

Patent Literature

[Patent Literature 1] JP 2003-038953 A

SUMMARY OF INVENTION

Technical Problem

However, the related-art carbon materials have a large specific surface area, and hence the related-art carbon materials are inevitably bulky in order to achieve a desired hydrogen storage amount.

The present invention has been made in view of the above-mentioned problem, and one of the objects of the present invention is to provide a carbon material that is compact and exhibits an excellent hydrogen storage capacity.

Solution to Problem

A carbon material according to one embodiment of the present invention for solving the above-mentioned problem has a specific surface area of 200 $m^2/g$ or less and exhibits a hydrogen storage capacity of $1.5 \times 10^{-5}$ $g/m^2$ or more at a hydrogen pressure of 10 MPa. According to the embodiment of the present invention, a carbon material that is compact and exhibits an excellent hydrogen storage capacity is provided.

The carbon material may have a total pore volume of 0.400 $cm^3/g$ or less. Further, the carbon material may have a ratio of a molar content of nitrogen atoms with respect to a molar content of carbon atoms, which is measured by an elemental analysis method, of 0.030 or more. Further, the carbon material may be free of a transition metal. Further, the carbon material may be obtained by carbonizing a raw material that contains an organic substance and is free of a transition metal.

Further, the carbon material may have a hydrogen storage amount (wt %) that increases linearly with respect to a hydrogen pressure. Further, when a hydrogen storage amount (wt %) of the carbon material is measured while a hydrogen pressure is increased from 0 MPa to 11.5 MPa, and then the hydrogen storage amount is measured while the hydrogen pressure is decreased from 11.5 MPa to 0 MPa, a ratio of the hydrogen storage amount at the hydrogen pressure of 4.0 MPa measured while the hydrogen pressure is decreased, with respect to the hydrogen storage amount at the hydrogen pressure of 4.0 MPa measured while the hydrogen pressure is increased, may be 1.2 or more.

A method according to one embodiment of the present invention for solving the above-mentioned problem includes using any one of the above-mentioned carbon materials for hydrogen storage. According to the embodiment of the present invention, a method of storing hydrogen including using a carbon material that is compact and exhibits an excellent hydrogen storage capacity is provided.

A method of producing a carbon material according to one embodiment of the present invention for solving the above-mentioned problem is a method of producing any one of the above-mentioned carbon materials by carbonizing a raw material containing an organic polymer, the method including: determining a main chain of the organic polymer; determining a plurality of candidate terminal groups as terminal groups of the determined main chain; providing a plurality of candidate polymers each containing the main chain and at least one kind of the determined plurality of candidate terminal groups; carbonizing raw materials containing the provided plurality of candidate polymers to prepare a plurality of candidate carbon materials; evaluating a hydrogen storage capacity of each of the prepared plurality of candidate carbon materials; selecting at least one kind of the candidate carbon material from the plurality of candidate carbon materials based on a result of the evaluation of the hydrogen storage capacity; and carbonizing a raw material containing, as the organic polymer, the candidate polymer used for preparing the selected candidate carbon material, to thereby produce the carbon material. According to the embodiment of the present invention, a method of producing a carbon material that is compact and exhibits an excellent hydrogen storage capacity is provided.

A method of producing a carbon material according to one embodiment of the present invention for solving the above-mentioned problem is a method of producing a carbon material by carbonizing a raw material containing an organic polymer, the method including: determining a main chain of the organic polymer; determining a plurality of candidate terminal groups as terminal groups of the determined main chain; providing a plurality of candidate polymers each containing the main chain and at least one kind of the determined plurality of candidate terminal groups; carbonizing raw materials containing the provided plurality of candidate polymers to prepare a plurality of candidate carbon materials; evaluating a hydrogen storage capacity of each of the prepared plurality of candidate carbon materials; selecting at least one kind of the candidate carbon material from the plurality of candidate carbon materials based on a result of the evaluation of the hydrogen storage capacity; and carbonizing a raw material containing, as the organic polymer, the candidate polymer used for preparing the selected candidate carbon material, to thereby produce the carbon material. According to the embodiment of the present invention, a method of producing a carbon material that is compact and exhibits an excellent hydrogen storage capacity is provided.

Advantageous Effects of Invention

According to the present invention, a carbon material that is compact and exhibits an excellent hydrogen storage capacity, and methods relating to the same are provided.

BRIEF DESCRIPTION OF DRAWINGS

FIG. 1A is an explanatory table for showing an example of results obtained by evaluating the characteristics of carbon materials in Examples 1 to 10 according to one embodiment of the present invention.

FIG. 1B is an explanatory table for showing an example of results obtained by evaluating the characteristics of carbon materials in Comparative Examples 1 to 8 according to one embodiment of the present invention.

FIG. 2A is an explanatory graph for showing an example of a correlation between the hydrogen pressure and the hydrogen storage amount of a carbon material, which is evaluated in Examples 1 to 5 according to one embodiment of the present invention.

DESCRIPTION OF EMBODIMENTS

Figure 2B:
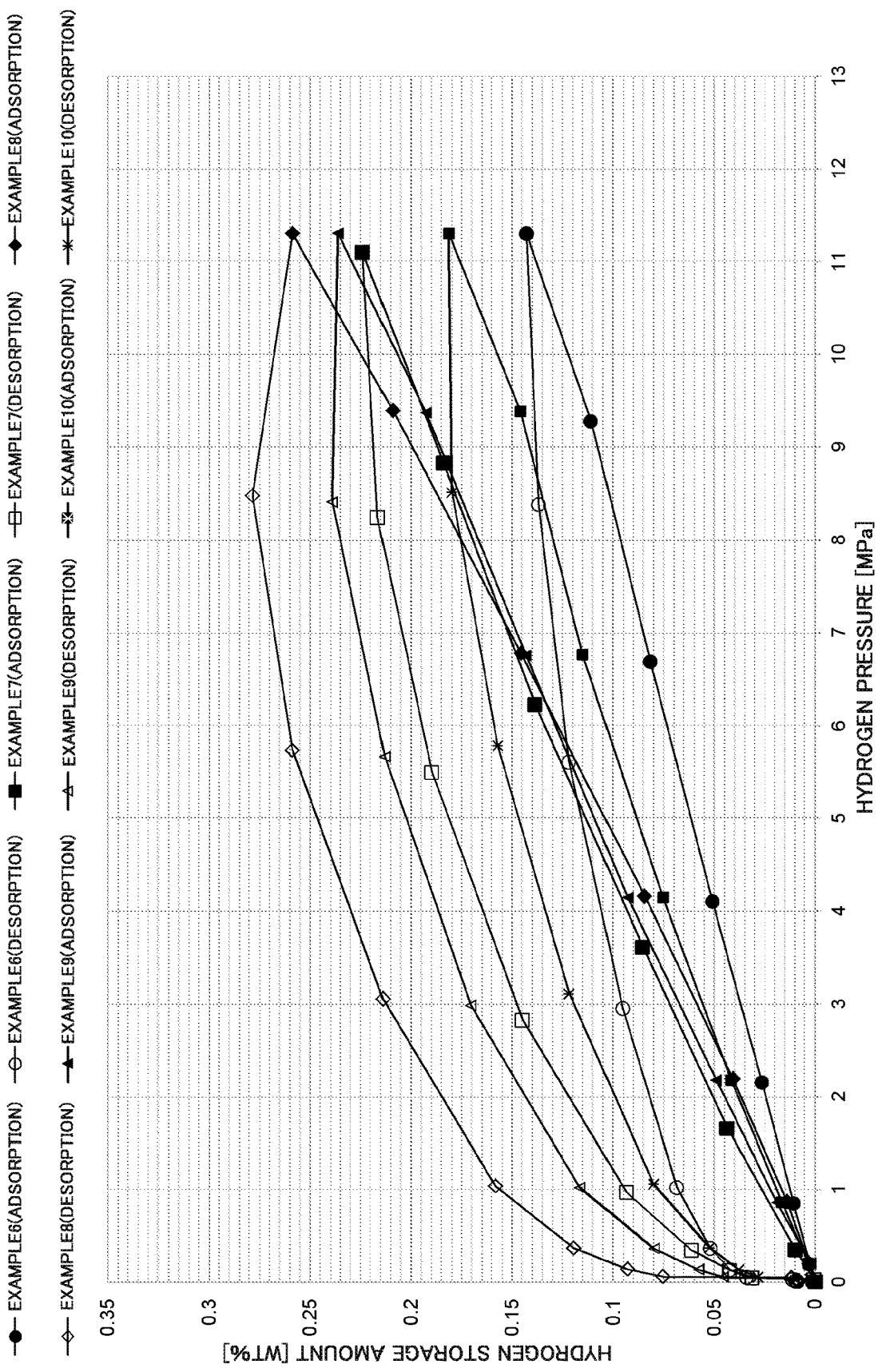
FIG. 2B is an explanatory graph for showing an example of a correlation between the hydrogen pressure and the hydrogen storage amount of a carbon material, which is evaluated in Examples 6 to 10 according to one embodiment of the present invention.

Now, one of the embodiments of the present invention will be described. The present invention is not limited to examples shown in the embodiment.

A carbon material according to the embodiment of the present invention (hereinafter referred to as "carbon material of the present invention") has a specific surface area of 200 $m^2/g$ or less and exhibits a hydrogen storage capacity of $1.5 \times 10^{-5}$ $g/m^2$ or more at a hydrogen pressure of 10 MPa.

In this connection, in order to enhance the hydrogen storage capacity of a carbon material, it has hitherto been considered to be effective to increase the number of pores of the carbon material, that is, to increase the specific surface area thereof. In contrast, unexpectedly, the carbon material of the present invention is compact and exhibits an excellent hydrogen storage capacity as described above. Thus, the carbon material of the present invention is preferably used as a carbon material for hydrogen storage. That is, the carbon material of the present invention is preferably applied to various devices and systems using hydrogen as fuel.

Therefore, one method according to the embodiment of the present invention may be a method including using the carbon material of the present invention for hydrogen storage. That is, in this method, the carbon material of the present invention is caused to store hydrogen to be used as fuel. Further, in this method, after the carbon material of the present invention is caused to store hydrogen, the hydrogen may be released from the carbon material of the present invention.

There is no particular limitation on the specific surface area of the carbon material of the present invention as long as the specific surface area is 200 $m^2/g$ or less. The specific surface area may be, for example, 170 $m^2/g$ or less, 150 $m^2/g$ or less, less than 100 $m^2/g$, 90 $m^2/g$ or less, or 80 $m^2/g$ or less.

More specifically, the specific surface area of the carbon material of the present invention may be, for example, 0.001 $m^2/g$ or more and 200 $m^2/g$ or less, 0.001 $m^2/g$ or more and 170 $m^2/g$ or less, 0.001 $m^2/g$ or more and 150 $m^2/g$ or less, 0.001 $m^2/g$ or more and less than 100 $m^2/g$, 0.001 $m^2/g$ or more and less than 90 $m^2/g$, or 0.001 $m^2/g$ or more and 80 $m^2/g$ or less. The specific surface area is measured by a BET method using nitrogen gas.

Further, in those cases, the specific surface area of the carbon material of the present invention may be, for example, 0.005 $m^2/g$ or more, 0.010 $m^2/g$ or more, 0.050 $m^2/g$ or more, or 0.100 $m^2/g$ or more.

There is no particular limitation on the hydrogen storage amount per unit surface area at a hydrogen pressure of 10 MPa of the carbon material of the present invention as long as the hydrogen storage amount is $1.5 \times 10^{-5}$ $g/m^2$ or more. The hydrogen storage amount per unit surface area at a hydrogen pressure of 10 MPa may be, for example, $1.8 \times 10^{-5}$ $g/m^2$ or more, or $2.0 \times 10^{-5}$ $g/m^2$ or more. While there is no particular limitation on the upper limit value of the hydrogen storage amount, the upper limit value may be, for example, 10 $g/m^2$ or less.

The hydrogen storage amount (wt %) of the carbon material of the present invention may increase linearly with respect to the hydrogen pressure. Specifically, for example, when hydrogen storage amounts (wt %) of the carbon material of the present invention at hydrogen pressures at at least three points are measured while the hydrogen pressure is increased from 0 MPa to 11.5 MPa, a coefficient of correlation (R) obtained by subjecting values of the hydrogen storage amounts measured at the at least three points to linear approximation by a least-square method may be 0.950 or more.

When the hydrogen storage amount (wt %) of the carbon material of the present invention is measured while the hydrogen pressure is increased from 0 MPa to 11.5 MPa, and subsequently, the hydrogen storage amount (wt %) is measured while the hydrogen pressure is decreased from 11.5 MPa to 0 MPa, a ratio of the hydrogen storage amount (wt %) at the hydrogen pressure of 4.0 MPa measured while the hydrogen pressure is decreased, with respect to the hydrogen storage amount (wt %) at the hydrogen pressure 4.0 MPa measured while the hydrogen pressure is increased, may be 1.2 or more.

That is, the carbon material of the present invention exhibits a relatively large hysteresis in a change in hydrogen storage amount (wt %) in association with the hydrogen pressure. The reason that such large hysteresis is exhibited is not clear, but it is conceivable that a chemical interaction with hydrogen, which is specific to the carbon structure of the carbon material of the present invention, is reflected.

The carbon material of the present invention is a porous carbon material. Specifically, the carbon material of the present invention has pores each having a diameter of less than 100 nm. In this respect, the carbon material of the present invention may have a total pore volume of 0.400 cm$^3$/g or less.

In this case, the total pore volume of the carbon material of the present invention may be, for example, 0.300 cm$^3$/g or less, 0.200 cm$^3$/g or less, 0.150 cm$^3$/g or less, or 0.100 cm$^3$/g or less. More specifically, the total pore volume of the carbon material of the present invention may be, for example, 0.001 cm$^3$/g or more and 0.400 cm$^3$/g or less, 0.001 cm$^3$/g or more and 0.300 cm$^3$/g or less, 0.001 cm$^3$/g or more and 0.200 cm$^3$/g or less, 0.001 cm$^3$/g or more and 0.150 cm$^3$/g or less, or 0.001 cm$^3$/g or more and 0.100 cm$^3$/g or less. Further, in those cases, the total pore volume of the carbon material of the present invention may be, for example, 0.002 cm$^3$/g or more, or 0.003 cm$^3$/g or more. The total pore volume of the carbon material is calculated based on the maximum adsorption amount in the BET method using nitrogen gas.

The carbon material of the present invention has, as part of the pores, micropores each having a diameter of less than 2 nm. In this respect, the total micropore volume of the carbon material of the present invention may be, for example, 0.040 cm$^3$/g or less, 0.035 cm$^3$/g or less, or 0.030 cm$^3$/g or less.

More specifically, the total micropore volume of the carbon material of the present invention may be, for example, 0.001 cm$^3$/g or more and 0.040 cm$^3$/g or less, 0.001 cm$^3$/g or more and 0.035 cm$^3$/g or less, or 0.001 cm$^3$/g or more and 0.030 cm$^3$/g or less. Further, in those cases, the total micropore volume of the carbon material of the present invention may be 0.002 cm$^3$/g or more, or 0.003 cm$^3$/g or more. The total micropore volume of the carbon material is calculated by applying a DR method to a nitrogen adsorption isotherm.

The carbon material of the present invention has, as part of the pores, mesopores each having a diameter of 2 nm or more and 50 nm or less. In this respect, the total mesopore volume of the carbon material of the present invention may be, for example, 0.300 cm$^3$/g or less, 0.200 cm$^3$/g or less, 0.100 cm$^3$/g or less, 0.050 cm$^3$/g or less, 0.015 cm$^3$/g or less, or 0.010 cm$^3$/g or less.

More specifically, the total mesopore volume of the carbon material of the present invention may be, for example, 0.001 cm$^3$/g or more and 0.300 cm$^3$/g or less, 0.001 cm$^3$/g or more and 0.200 cm$^3$/g or less, 0.001 cm$^3$/g or more and 0.100 cm$^3$/g or less, 0.001 cm$^3$/g or more and 0.050 cm$^3$/g or less, 0.001 cm$^3$/g or more and 0.015 cm$^3$/g or less, or 0.001 cm$^3$/g or more and 0.010 cm$^3$/g or less. The total mesopore volume of the carbon material is calculated by a BJH method.

It is preferred that the carbon material of the present invention contain nitrogen. In this respect, the carbon material of the present invention may have a ratio of a molar content (%) of nitrogen atoms with respect to a molar content (%) of carbon atoms (hereinafter referred to as "N/C ratio"), which is measured by an elemental analysis method, of 0.030 or more.

In this case, the N/C ratio (—) of the carbon material of the present invention may be, for example, 0.035 or more, 0.039 or more, 0.040 or more, or 0.041 or more. More specifically, the N/C (—) of the carbon material of the present invention may be, for example, 0.030 or more and 0.075 or less, 0.035 or more and 0.075 or less, 0.039 or more and 0.075 or less, 0.040 or more and 0.075 or less, or 0.041 or more and 0.075 or less. Further, in those cases, the N/C (—) of the carbon material of the present invention may be, for example, 0.070 or less, or 0.065 or less.

The carbon material of the present invention may be free of a transition metal. In this case, the transition metal refers to a metal belonging to the groups 3 to 12 in the periodic table. The carbon material of the present invention may be obtained by carbonizing a raw material that contains an organic substance and is free of a transition metal. That is, a method of producing the carbon material of the present invention may be a method involving carbonizing a raw material that contains an organic substance and is free of a transition metal.

The carbon material of the present invention may be free of a metal. Further, the carbon material of the present invention may be obtained by carbonizing a raw material that contains an organic substance and is free of a metal. That is, the method of producing the carbon material of the present invention may be a method involving carbonizing a raw material that contains an organic substance and is free of a metal.

Carbonization is performed by heating a raw material and keeping the raw material at a temperature at which the raw material is carbonized (hereinafter referred to as "carbonization temperature"). There is no particular limitation on the carbonization temperature as long as the raw material is carbonized at the temperature. The carbonization temperature may be, for example, 300° C. or more, or 700° C. or more. More specifically, the carbonization temperature may be, for example, from 300° C. to 3,000° C., or from 700° C. to 2,000° C.

The temperature increase rate up to the carbonization temperature is, for example, from 0.5° C./min to 300° C./min. A time period for keeping the raw material at the carbonization temperature is, for example, from 5 minutes to 24 hours. It is preferred that carbonization be performed under a stream of inert gas such as nitrogen.

There is no particular limitation on the organic substance contained in the raw material as long as the organic substance can be carbonized (can be used as a carbon source), and any one or more kinds of organic substances, such as an organic high-molecular-weight compound (for example, an organic polymer), an organic low-molecular-weight compound, and biomass, are used.

As the organic substance, an organic substance containing nitrogen is preferably used. There is no particular limitation on the nitrogen-containing organic substance as long as the organic substance contains an organic compound containing a nitrogen atom in a molecule thereof. For example, any one or more kinds of nitrogen-containing organic substances, such as a nitrogen-containing organic high-molecular-weight compound, a nitrogen-containing organic low-molecular-weight compound, and nitrogen-containing biomass, are used.

As the nitrogen-containing organic compound, a nitrogen-containing organic polymer is preferably used. There is no particular limitation on the nitrogen-containing organic polymer as long as the organic polymer contains a nitrogen atom in a molecule thereof. Any one or more kinds of nitrogen-containing organic polymers are used.

Specifically, the nitrogen-containing organic polymer may be, for example, one or more kinds selected from the group consisting of polycarbodiimide, polypyrrole, polyvinylpyrrole, 3-methylpolypyrrole, polyvinylpyridine, polyaniline, polyaminobismaleimide, polyimide, polybenzimidazole, polyamide, polyacrylonitrile, chitin, chitosan, silk, wool, polyamino acids, nucleic acids, DNA, RNA, polycarbazole, polybismaleimide, guanamine resins, melamine resins, and polyamide imide resins.

There is no particular limitation on the content of the organic polymer (for example, the nitrogen-containing organic polymer) in the raw material as long as the carbon material of the present invention having the above-mentioned characteristics is obtained. The content may be, for example, from 1 wt % to 100 wt %, or from 10 wt % to 100 wt %.

As the nitrogen-containing organic polymer, for example, polycarbodiimide is preferably used. In this case, the carbon material of the present invention may be obtained by carbonizing a raw material that contains polycarbodiimide and is free of a transition metal.

There is no particular limitation on the polycarbodiimide as long as the polycarbodiimide is a polymer of a carbodiimide. There is no particular limitation on the polymerization degree of the polycarbodiimide. The polymerization degree may be, for example, 2 or more and 30 or less, 2 or more and 25 or less, or 2 or more and 20 or less. Further, in those cases, the polymerization degree of the polycarbodiimide may be, for example, 3 or more, or 4 or more.

As the polycarbodiimide, for example, polycarbodiimide obtained by a condensation reaction of an organic diisocyanate involving the removal of carbon dioxide may be used. More specifically, the polycarbodiimide is obtained, for example, by heating with stirring the organic diisocyanate in a solvent or without a solvent in the presence of a phosphorus catalyst or a titanium catalyst. The form of the polycarbodiimide thus obtained varies depending on the kind of the organic diisocyanate used as the raw material and is mainly a powder form, a lump form, a liquid form, a starch syrup form, or a varnish form dissolved in a solvent. In this embodiment, polycarbodiimide in any form may be used.

There is no particular limitation on the carbodiimide forming the polycarbodiimide as long as the carbodiimide is a compound having a functional group "—N=C=N—". For example, the carbodiimide is synthesized through use of one or more kinds selected from the group consisting of an aromatic diisocyanate, an aliphatic diisocyanate, and an alicyclic diisocyanate.

Specifically, the carbodiimide forming the polycarbodiimide may be synthesized through use of one or more kinds selected from the group consisting of, for example, 2,4-tolylene diisocyanate (TDI), 2,6-tolylene diisocyanate (TDI), xylylene diisocyanate (XDI), tetramethylxylylene diisocyanate (TMXDI), diphenylmethane diisocyanate (MDI), isophorone diisocyanate (IPDI), 1,5-naphthylene diisocyanate (NDI), hexamethylene diisocyanate (HDI), tolidine diisocyanate (TODI), phenylene diisocyanate (PPDI), dicyclohexylmethane diisocyanate (HMDI), lysine diisocyanate (LDI), hydrogenated xylylene diisocyanate (hydrogenated XDI), cyclohexyl diisocyanate (CHPI), bis(4-isocyanatocyclohexyl)methane, hydrogenated diphenylmethane diisocyanate, and derivatives thereof.

There is no particular limitation on the content of the polycarbodiimide in the raw material. The content may be, for example, 1 wt % or more and 100 wt % or less, or 2 wt % or more and 100 wt % or less.

When the raw material contains polycarbodiimide, the raw material may contain a polymer having a main chain formed of the polycarbodiimide. In this case, the carbon material of the present invention may be obtained by carbonizing a raw material that contains a polymer having a main chain formed of polycarbodiimide and is free of a transition metal.

The polymer having a main chain formed of polycarbodiimide has a terminal group. That is, in polymerization of a polymer having a main chain formed of polycarbodiimide, a sealing agent that reacts with an isocyanate group is used, and as a result, the polymer has a terminal group formed of the sealing agent. There is no particular limitation on the sealing agent forming the terminal group as long as the sealing agent reacts with an isocyanate group and is used as a sealing agent in polymerization. Specifically, the sealing agent forming the terminal group may have, for example, one or more kinds of functional groups selected from the group consisting of an $NH_2$ group, an OH group, a COOH group, an NCO group, and an SH group. The molar mass of the sealing agent forming the terminal group may be, for example, 17 g/mol or more and 1,000 g/mol or less, 17 g/mol or more and 800 g/mol or less, 17 g/mol or more and 600 g/mol or less, or 17 g/mol or more and 400 g/mol or less. Further, in those cases, the molar mass of the sealing agent forming the terminal group may be, for example, 18 g/mol or more, or 19 g/mol or more.

The content of the polymer having a main chain formed of polycarbodiimide in the raw material may be, for example, 1 wt % or more and 100 wt % or less, or 2 wt % or more and 100 wt % or less.

The carbon material of the present invention may be produced without performing activation treatment. In this respect, in production of a large number of carbon materials, the activation treatment has hitherto been performed in order to enhance their characteristics. In contrast, the above-mentioned excellent characteristics of the carbon material of the present invention are achieved without performing the activation treatment. Therefore, the carbon material of the present invention is produced efficiently in a process simplified compared to that of the related art.

The carbon material of the present invention is produced by the method involving carbonizing a raw material as described above. In this connection, the inventors of the present invention have found that, when a carbon material is produced by carbonizing a raw material containing an organic polymer having a main chain and a terminal group, the hydrogen storage capacity of the carbon material varies depending on the kind of the terminal group.

In view of the foregoing, a method of producing a carbon material according to the embodiment of the present invention may be, for example, a method of producing a carbon material by carbonizing a raw material containing an organic polymer, the method including: determining a main chain of the organic polymer; determining a plurality of candidate terminal groups as terminal groups of the determined main chain; providing a plurality of candidate polymers each containing the main chain and at least one kind of the determined plurality of candidate terminal groups; carbonizing raw materials containing the provided plurality of candidate polymers to prepare a plurality of candidate carbon materials; evaluating a hydrogen storage capacity of each of the prepared plurality of candidate carbon materials; selecting at least one kind of the candidate carbon material from the plurality of candidate carbon materials based on a result of the evaluation of the hydrogen storage capacity; and carbonizing a raw material containing, as the organic polymer, the candidate polymer used for preparing the selected candidate carbon material, to thereby produce the carbon material.

That is, in this method, first, a main chain of an organic polymer is determined. In this case, it is preferred that the organic polymer be the above-mentioned nitrogen-containing organic polymer. Further, as a main chain of the nitrogen-containing organic polymer, for example, a main chain formed of polycarbodiimide is preferably used.

Next, a plurality of candidate terminal groups are determined as terminal groups of the determined main chain. There is no particular limitation on the plurality of candidate terminal groups as long as the plurality of candidate terminal groups are different kinds of groups. For example, when a main chain formed of polycarbodiimide is used, a plurality of candidate terminal groups of different kinds, each of which reacts with an isocyanate group, are preferably used.

Further, the plurality of candidate terminal groups may be, for example, a plurality of candidate terminal groups obtained from a plurality of sealing agents having different molar masses. The molar mass of each of the sealing agents forming the terminal groups may be, for example, 17 g/mol or more and 1,000 g/mol or less, 17 g/mol or more and 800 g/mol or less, 17 g/mol or more and 600 g/mol or less, or 17 g/mol or more and 400 g/mol or less. Further, in those cases, the molar mass of each of the sealing agents forming the terminal groups may be, for example, 18 g/mol or more, or 19 g/mol or more.

Next, a plurality of candidate polymers each containing the main chain and at least one kind of the plurality of candidate terminal groups are provided. For providing the plurality of candidate polymers, the candidate polymers may be synthesized or the candidate polymers synthesized in advance may be obtained.

Next, raw materials containing the provided plurality of candidate polymers are carbonized to prepare a plurality of candidate carbon materials. That is, raw materials containing different candidate polymers are carbonized to prepare a plurality of candidate carbon materials using different candidate polymers in their raw materials.

Next, the hydrogen storage capacity of each of the prepared plurality of candidate carbon materials is evaluated. That is, the hydrogen storage capacity of each of the plurality of candidate carbon materials is measured and they are compared to each other.

Next, at least one kind of the candidate carbon material is selected from the plurality of candidate carbon materials based on a result of the evaluation of the hydrogen storage capacity. That is, a candidate carbon material having a desired hydrogen storage capacity is selected from the plurality of candidate carbon materials. Specifically, for example, one kind of the candidate carbon material having the highest hydrogen storage capacity may be selected from the plurality of candidate carbon materials, or two or more kinds (but not all the kinds) of the candidate carbon materials each having a high hydrogen storage capacity may be selected from the plurality of candidate carbon materials.

Next, a raw material containing, as the organic polymer, the candidate polymer used for preparing the selected candidate carbon material is carbonized to produce a carbon material. That is, the candidate polymer used for preparing the selected candidate carbon material is determined as an organic polymer preferred for achieving the desired hydrogen storage capacity, and the raw material containing the organic polymer is actually carbonized to produce a carbon material. According to such a method, the carbon material having the desired hydrogen storage capacity is produced efficiently.

Next, specific Examples according to the embodiment are described.

EXAMPLES

[Preparation of Raw Material]

A carbon material was produced by a method including carbonizing a raw material that contained an organic polymer and was free of a transition metal. As the organic polymer, a polymer having a main chain formed of polycarbodiimide having a polymerization degree of from 4 to 13 and a terminal group obtained from a sealing agent having a molar mass of from 30 g/mol to 400 g/mol was used.

As the polycarbodiimide, a polymer of tolylene diisocyanate (TDI), tolidine diisocyanate (TODI), diphenylmethane diisocyanate (MDI), naphthylene diisocyanate (NDI), phenylene diisocyanate (PPDI), or xylylene diisocyanate (XDI) was used.

As the sealing agent forming the terminal group, methanol (molar mass: 32.04 g/mol), phenyl isocyanate (molar mass: 119.12 g/mol), octanol (molar mass: 130.23 g/mol), dodecyl alcohol (molar mass: 186.34 g/mol), oleyl alcohol (molar mass: 268.48 g/mol), or polyethylene glycol methyl ether (molar mass: 400.00 g/mol) was used.

Example 1

22.4 g of naphthylene diisocyanate (NDI), 0.11 g of a carbodiimidization catalyst (3-methyl-1-phenyl-2-phospholene-1-oxide), 1.37 g of methanol, and toluene serving as a solvent were loaded into a four-necked flask, and the mixture was adjusted so that the total concentration of the diisocyanate and the sealing agent (methanol) reached 20 wt %. Next, the resultant was caused to react at 60° C. for 1 hour with stirring in a nitrogen gas atmosphere and polymerized at 100° C. for 5 hours. It was confirmed by an IR (Fourier transform infrared spectrometer manufactured by Shimadzu Corporation) that a peak of isocyanate was eliminated. Thus, an organic polymer containing a main chain formed of polycarbodiimide was synthesized.

Next, the obtained organic polymer solution was cast onto a Teflon (trademark) sheet and dried in a fume hood for half a day to remove the solvent. Then, the resultant was kept in a muffle furnace under a stream of air at 80° C. for 3 hours and at 120° C. for 3 hours, to thereby further remove the solvent. After that, the composition was kept at 200° C. for 5 hours and at 230° C. for 4 hours to be subjected to curing treatment. The cured product thus obtained was used as a raw material for carbonization.

The raw material prepared as described above was heated at 10° C./min in a tubular furnace under a stream of nitrogen and kept at 1,000° C. for 1 hour to be carbonized, to thereby provide a carbon material.

Example 2

An organic polymer was synthesized and a carbon material was produced in the same manner as in Example 1 except that 23.0 g of tolylene diisocyanate (TDI) was used as the diisocyanate in place of NDI, 0.12 g of the carbodiimidization catalyst and 1.7 g of methanol were used, and the polymerization was performed for 9 hours.

Example 3

An organic polymer was synthesized and a carbon material was produced in the same manner as in Example 1 except that 22.7 g of xylylene diisocyanate (XDI) was used as the diisocyanate in place of NDI, cyclohexanone was used as the solvent in place of toluene, 0.12 g of the carbodiimidization catalyst and 1.5 g of methanol were used, and the polymerization was performed for 4 hours.

Example 4

An organic polymer was synthesized and a carbon material was produced in the same manner as in Example 1 except that 22.0 g of diphenylmethane diisocyanate (MDI) was used as the diisocyanate in place of NDI, 0.12 g of the carbodiimidization catalyst and 1.1 g of methanol were used, the reaction was performed at 65° C. for 45 minutes, and the polymerization was performed at 100° C. for 3 hours.

Example 5

An organic polymer was synthesized and a carbon material was produced in the same manner as in Example 1 except that 32.8 g of tolidine diisocyanate (TODI) was used as the diisocyanate in place of NDI, 0.17 g of the carbodiimidization catalyst and 1.6 g of methanol were used, the total concentration of the diisocyanate and the sealing agent (methanol) was set to 30 wt %, the reaction was performed at 65° C. for 30 minutes, and the polymerization was performed at 100° C. for 4 hours and 30 minutes.

Example 6

An organic polymer was synthesized and a carbon material was produced in the same manner as in Example 1 except that 46.4 g of tolylene diisocyanate (TDI) was used as the diisocyanate in place of NDI, 0.10 g of the carbodiimidization catalyst was used, 4.5 g of phenyl isocyanate was used as the sealing agent in place of methanol, the total concentration of the diisocyanate and the sealing agent was set to 40 wt %, and the polymerization was performed for 3 hours.

Example 7

An organic polymer was synthesized and a carbon material was produced in the same manner as in Example 6 except that 34.4 g of TDI and 0.19 g of the carbodiimidization catalyst were used, 3.7 g of octanol was used as the sealing agent in place of phenyl isocyanate, and the total concentration of the diisocyanate and the sealing agent was set to 30 wt %.

Example 8

An organic polymer was synthesized and a carbon material was produced in the same manner as in Example 6 except that 30.4 g of TDI and 0.19 g of the carbodiimidization catalyst were used, 6.7 g of oleyl alcohol was used as the sealing agent in place of phenyl isocyanate, the total concentration of the diisocyanate and the sealing agent was set to 30 wt %, and the polymerization was performed for 6 hours.

Example 9

An organic polymer was synthesized and a carbon material was produced in the same manner as in Example 6 except that 32.7 g of TDI and 0.19 g of the carbodiimidization catalyst were used, 5.0 g of dodecyl alcohol was used as the sealing agent in place of phenyl isocyanate, the total concentration of the diisocyanate and the sealing agent was set to 30 wt %, and the polymerization was performed for 6 hours.

Example 10

An organic polymer was synthesized and a carbon material was produced in the same manner as in Example 6 except that 27.4 g of TDI and 0.18 g of the carbodiimidization catalyst were used, 9.0 g of polyethylene glycol methyl ether (molecular weight: 400) was used as the sealing agent in place of phenyl isocyanate, the total concentration of the diisocyanate and the sealing agent was set to 30 wt %, and the polymerization was performed for 4 hours.

[Measurement of Specific Surface Area, Total Pore Volume, Total Micropore Volume, and Total Mesopore Volume]

Each carbon material obtained as described above was subjected to nitrogen adsorption and desorption measurement at 77 K. That is, the specific surface area, the total pore volume, the total micropore volume, and the total mesopore volume of the carbon material were measured through a use of an automatic specific surface area and pore distribution measurement apparatus (BELSORP-mini II manufactured by BEL Japan, Inc.).

Specifically, first, 0.05 g of a carbon material was kept at 400° C. and a pressure of 1 Pa or less for 12 hours to remove water adsorbing to the carbon material. Then, the specific surface area of the carbon material was measured by a BET method using nitrogen gas. Further, the total pore volume was calculated from the maximum adsorption amount of nitrogen gas. Further, the micropore volume was calculated by a DR method, and the mesopore volume was calculated by a BJH method.

The DR method is a method developed for investigation of micropores of activated carbon, and is used for samples having various micropores (Dubinin, M. M. In Progress in Surface and Membrane Science, 9 (D. A. Cadenhead ed.), Academic Press 1975). Further, the BJH method is a typical method of determining the distribution of mesopores proposed by Barrett, Joyner, and Halenda (E. P. Barrett, L. G. Joyner, and P. P. Halenda, J. Am. Chem. Soc., 73, 373, (1951)).

[Measurement of Hydrogen Storage Capacity]

Each carbon material obtained as described above was measured for a hydrogen storage amount at a hydrogen pressure of from 0 MPa to 11.5 MPa at 298 K in accordance with JIS H 7201. That is, first, about 1 g of the carbon material was loaded into a sample tube and evacuated until the pressure in the sample tube reached 10 Pa or less. The sample tube was kept at 200° C. for 2 hours, to thereby subject the carbon material to pretreatment. After that, He gas was introduced into the sample tube, and the volume of the carbon material was measured. Further, the sample tube was evacuated for 3 hours or more to remove the He gas from the test tube.

Then, hydrogen gas was introduced into the test tube, and a hydrogen storage amount (wt %) was measured while the hydrogen pressure was increased from 0 MPa to 11.5 MPa. Subsequently, the hydrogen storage amount (wt %) was measured while the hydrogen pressure was reduced from 11.5 MPa to 0 MPa.

Further, the hydrogen storage amount (wt %) at a hydrogen pressure of 10 MPa thus obtained was converted into a hydrogen storage amount (g) per g of the carbon material. The obtained value was divided by the specific surface area obtained as described above, to thereby calculate a hydrogen storage amount ($g/m^2$) per unit surface area at a hydrogen pressure of 10 MPa. Specifically, the hydrogen storage amount (wt %) represents a ratio (wt %) of a hydrogen amount (g) stored per g of the carbon material. Therefore, for example, the hydrogen storage amount ($g/m^2$) per unit surface area of a carbon material having a specific surface area of 200 $m^2/g$ and a hydrogen storage amount of 0.2 (wt %) is calculated by the following expression:

$$(0.2/100)/200=1.0\times10^{-5} \text{ (g/m}^2).$$

[Measurement of Atom Ratio (N/C Ratio) (Elemental Analysis Method)]

The contents of carbon atoms and nitrogen atoms in each carbon material were measured by a combustion method through use of an organic elemental microanalysis apparatus (2400II manufactured by PerkinElmer Co., Ltd.). 2 mg of the carbon material was analyzed using helium as a carrier gas under conditions of a combustion tube temperature of 980° C. and a reduction tube temperature of 640° C. A ratio of the molar content (%) of the nitrogen atoms with respect to the molar content (%) of the carbon atoms thus obtained was calculated as an N/C ratio.

Comparative Example 1

A carbon material was produced by a method including carbonizing a raw material containing an organic polymer and a transition metal.

Specifically, 100 mL of acetone was mixed with 10 g of a phenol resin to prepare a mixed solution. 3.05 g of phthalocyanine iron was added to the mixed solution, and the resultant was stirred at normal temperature for 1 hour through use of a magnetic stirrer. The solvent was removed from the mixture at 60° C. through use of a rotary evaporator while the mixture was irradiated with an ultrasonic wave. Thus, a raw material containing an organic polymer and a transition metal was obtained.

Next, the raw material was carbonized. Specifically, the raw material was loaded into a quartz tube, and the quartz tube was purged with nitrogen gas for 20 minutes in an elliptical surface reflection type infrared gold image furnace. Then, heating was started to increase the temperature in the gold image furnace from room temperature to 800° C. at a temperature increase rate of 10° C./min. After that, the quartz tube was kept at 800° C. for 1 hour. Thus, a carbon material generated by carbonizing the raw material was obtained.

Further, the carbon material was subjected to pulverization treatment. Specifically, silicon nitride balls each having a diameter of 1.5 mm were placed in a planetary ball mill (P-7 manufactured by Fritsch Japan Co., Ltd.), and the carbon material obtained by carbonization treatment was pulverized at a rotation speed of 800 rpm for 60 minutes. The pulverized carbon material was removed from the planetary ball mill and classified with a sieve having an opening of 106 μm. Thus, a powdery carbon material having passed through the sieve was obtained as a comparative material 1.

Comparative Example 2

The comparative material 1 obtained in Comparative Example 1 was subjected to $CO_2$ activation treatment. Specifically, the comparative material 1 was loaded into a quartz tube, and the quartz tube was purged with $CO_2$ gas for 20 minutes in an elliptical surface reflection type infrared gold image furnace. Then, heating was started to increase the temperature in the gold image furnace from room tempera-ture to 800° C. at a temperature increase rate of 50° C./min. After that, the quartz tube was kept at 800° C. for 1 hour. A carbon material thus obtained was used as a comparative material 2.

Comparative Example 3

A carbon material was produced by a method including carbonizing a raw material containing an organic polymer and a transition metal.

Specifically, 1.5 g of a polyacrylonitrile-polymethacrylic acid copolymer was dissolved in 20 g of dimethylformamide. After that, 1.5 g of cobalt chloride hexahydrate and 1.5 g of 2-methylimidazole were added to the resultant, and the mixture was stirred for 2 hours to provide a blue solution. Ketjenblack (EC600JD manufactured by Lion Corporation) was added to the obtained solution so as to achieve 30 wt %, followed by mixing through use of a mortar. Thus, a raw material containing an organic polymer and a transition metal was obtained.

Next, the raw material was subjected to infusibilization treatment. Specifically, the raw material was placed in a forced-circulation type dryer. Then, the forced-circulation type dryer was increased in temperature from room temperature to 150° C. over 30 minutes in the atmosphere and subsequently increased in temperature from 150° C. to 220° C. over 2 hours. After that, the raw material was kept at 220° C. for 3 hours. Thus, the raw material was infusibilized.

Then, the raw material was carbonized. Specifically, the raw material subjected to infusibilization treatment was loaded into a quartz tube, and the quartz tube was purged with nitrogen for 20 minutes in an elliptical surface reflection type infrared gold image furnace. Then, heating was started to increase the temperature in the gold image furnace from room temperature to 900° C. at a temperature increase rate of 10° C./min. After that, the quartz tube was kept at 900° C. for 1 hour. Thus, a carbon material generated by carbonizing the raw material was obtained.

Further, the carbon material was subjected to pulverization treatment in the same manner as in the comparative material 1, to thereby provide a powdery carbon material as a comparative material 3.

Comparative Example 4

The comparative material 3 obtained in Comparative Example 3 was subjected to $CO_2$ activation treatment in the same manner as in Comparative Example 2. A carbon material thus obtained was used as a comparative material 4.

Comparative Example 5

Porous carbon (MAXSORB (trademark) manufactured by Kansai Coke and Chemicals Co., Ltd.) which was alkali-activated carbon was used as a comparative material 5.

Comparative Example 6

Powdery activated carbon (Kuraray Coal PW for water purification manufactured by Kuraray Chemical Co., Ltd.) was used as a comparative material 6.

Comparative Example 7

Carbon black (VULCAN XC-72 manufactured by Cabot Japan K.K.) was used as a comparative material 7.

Comparative Example 8

Carbon black (Ketjenblack EC600JD manufactured by Lion Corporation) was prepared as a comparative material 8.

[Measurement]

Each of the comparative materials 1 to 8 was measured for a specific surface area, a total pore volume, a total micropore volume, a total mesopore volume, an N/C ratio, and a hydrogen storage capacity in the same manner as in Examples 1 to 10.

[Results]

FIG. 1A and FIG. 1B are each a table for showing the raw material (main chain of the polymer, the polymerization degree of the main chain, the kind and molar mass of the sealing agent forming the terminal group), the hydrogen storage amount at a hydrogen pressure of 10 MPa, the specific surface area, the total pore volume, the total mesopore volume, the total micropore volume, and the N/C ratio of each material of Examples 1 to 10 and Comparative Examples 1 to 8.

As shown in FIG. 1B, the specific surface area of each carbon material according to Comparative Examples 1 to 8 was from 301 $m^2/g$ to 2,870 $m^2/g$. In contrast, as shown in FIG. 1A, the specific surface area of each carbon material according to Examples 1 to 10 was from 1 $m^2/g$ to 160 $m^2/g$. That is, the specific surface area of each carbon material according to Examples 1 to 10 was significantly smaller than that of each carbon material according to Comparative Examples 1 to 8. Of those, the specific surface area of each carbon material according to Examples 1, 2, and 4 to 10 was particularly significantly small.

Further, the hydrogen storage amount per unit area at a hydrogen pressure of 10 MPa of each carbon material according to Comparative Examples 1 to 8 was from $0.27 \times 10^{-5}$ $g/m^2$ to $0.82 \times 10^{-5}$ $g/m^2$. In contrast, the hydrogen storage amount at a hydrogen pressure of 10 MPa of each carbon material according to Examples 1 to 10 was from $1.94 \times 10^{-5}$ $g/m^2$ to $180 \times 10^{-5}$ $g/m^2$. That is, the hydrogen storage amount per unit area of each carbon material according to Examples 1 to 10 was significantly larger than that of each carbon material according to Comparative Examples 1 to 8. Of those, the hydrogen storage amount per unit area of each carbon material according to Examples 1, 2, and 4 to 10 was particularly significantly large.

As described above, it was confirmed that each carbon material according to Examples 1 to 10 (in particular, Examples 1, 2, and 4 to 10) was compact and exhibited an excellent hydrogen storage capacity compared to each carbon material according to Comparative Examples 1 to 8.

FIG. 2A and FIG. 2B are each a graph for showing results obtained by measuring the hydrogen storage amount (wt %) of each carbon material according to Examples 1 to 5 and Examples 6 to 10 while changing a hydrogen pressure. As shown in FIG. 2A and FIG. 2B, the hydrogen storage amounts (black marks in FIG. 2A and FIG. 2B), which were measured while the hydrogen pressure was increased, increased linearly with respect to the hydrogen pressure.

Specifically, a coefficient of correlation (R), which was obtained by subjecting values of the hydrogen storage amounts measured while the hydrogen pressure was increased from 0 MPa to 11.5 MPa to linear approximation by a least-square method, was from 0.968 to 0.999.

Further, as shown in FIG. 2A and FIG. 2B, a relatively large hysteresis was confirmed. Specifically, a ratio of the hydrogen storage amount (wt %) at the hydrogen pressure of 4.0 MPa measured while the hydrogen pressure was decreased, with respect to the hydrogen storage amount (wt %) at the hydrogen pressure of 4.0 MPa measured while the hydrogen pressure was increased, was from 1.2 to 2.9.

Figure 3:
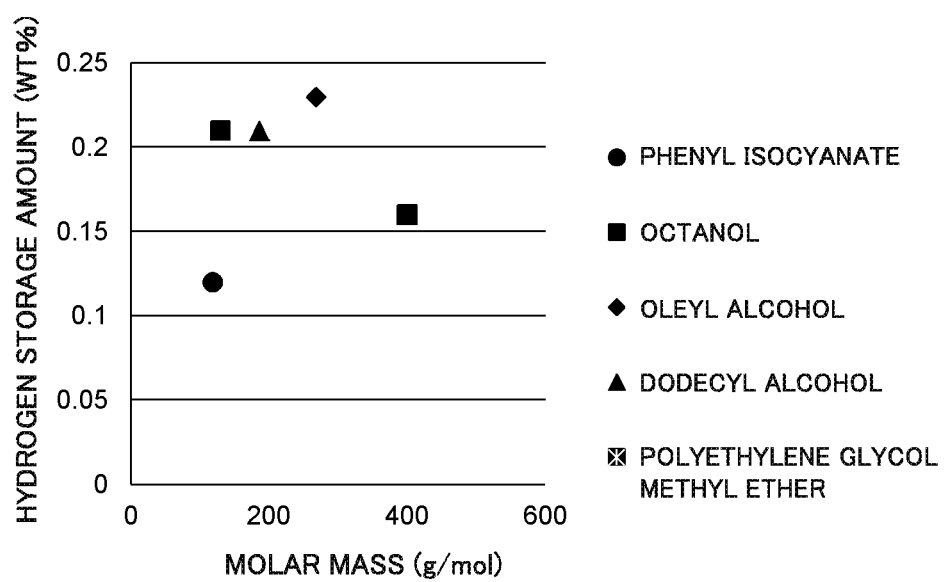
FIG. 3 is an explanatory graph for showing an example of a correlation between the molar mass of a sealing agent forming a terminal group of an organic polymer and the hydrogen storage amount of a carbon material, which is evaluated in Examples according to one embodiment of the present invention.

FIG. 3 is a graph for showing a correlation between the molar mass (g/mol) of the sealing agent forming the terminal group of the organic polymer used in the production of each carbon material according to Examples 6 to 10 and the hydrogen storage amount (wt %) of the carbon material.

As shown in FIG. 3, the hydrogen storage capacity of the carbon material changed in accordance with the molar mass of the sealing agent forming the terminal group of the organic polymer used in the production of the carbon material. In particular, in a range of the molar mass of the sealing agent forming the terminal group of from 100 g/mol to 300 g/mol, the following tendency was confirmed: the hydrogen storage amount (wt %) of the carbon material also increased with an increase in molar mass of the sealing agent forming the terminal group.

Thus, it was considered that the hydrogen storage capacity of the carbon material could be controlled by the kind and molar mass of the sealing agent forming the terminal group of the organic polymer used in the raw material for carbonization. Further, a terminal group capable of achieving a desired hydrogen storage capacity is specified by comparing a plurality of terminal groups obtained from a plurality of sealing agents having different molar masses in terms of the hydrogen storage capacity of the carbon material, and then, a carbon material having the desired hydrogen storage capacity should also be produced efficiently through use of an organic polymer having the specified terminal group.

In Examples, polycarbodiimide was used as the main chain of the nitrogen-containing organic polymer, but other main chains may be used as long as the carbon material of the present invention is produced. Specifically, for example, it is presumed that polycarbodiimide forms a trimer, and hence a main chain formed of a melamine resin or a guanamine resin having a triazine ring similar to the trimer may be used.

The invention claimed is:

1. A porous carbonized material, which has a specific surface area of 200 $m^2/g$ or less and exhibits a hydrogen storage capacity of $1.5 \times 10^{-5}$ $g/m^2$ or more at a hydrogen pressure of 10 MPa,
   wherein the carbonized material is free of a transition metal,
   the carbonized material has mesopores each having a diameter of 2 nm or more and 50 nm or less at a total mesopore volume of is 0.001 $cm^3/g$ or more and 0.015 $cm^3/g$ or less, and
   the carbonized material has a ratio of a molar content of nitrogen atoms with respect to a molar content of carbon atoms, which is measured by an elemental analysis method, of 0.030 or more.

2. The porous carbonized material according to claim 1, wherein the carbonized material has a total pore volume of 0.400 $cm^3/g$ or less.

3. The porous carbonized material according to claim 1, wherein the carbonized material is obtained by carbonizing a raw material that contains an organic substance and is free of the transition metal.

4. The porous carbonized material according to claim 1, wherein the carbonized material has a hydrogen storage amount (wt %) that increases linearly with respect to a hydrogen pressure.

5. The porous carbonized material according to claim 1, wherein, when a hydrogen storage amount (wt %) of the carbonized material is measured while a hydrogen pressure is increased from 0 MPa to 11.5 MPa, and then the hydrogen storage amount is measured while the hydrogen pressure is decreased from 11.5 MPa to 0 MPa, a ratio of the hydrogen storage amount at the hydrogen pressure of 4.0 MPa measured while the hydrogen pressure is decreased, with respect to the hydrogen storage amount at the hydrogen pressure of 4.0 MPa measured while the hydrogen pressure is increased, is 1.2 or more.

6. A method for storing hydrogen comprising: storing hydrogen in the porous carbonized material of claim 1 by bringing the porous carbonized material in contact with hydrogen.

7. A method of producing the porous carbonized material of claim 1 by carbonizing a raw material containing an organic polymer, the method comprising:
  determining a main chain of the organic polymer;
  determining a plurality of candidate terminal groups as terminal groups of the determined main chain;
  providing a plurality of candidate polymers each containing the main chain and at least one kind of the determined plurality of candidate terminal groups;
  carbonizing raw materials containing the provided plurality of candidate polymers to prepare a plurality of candidate carbonized materials;
  evaluating a hydrogen storage capacity of each of the prepared plurality of candidate carbonized materials;
  selecting at least one kind of the candidate carbonized material from the plurality of candidate carbonized materials based on a result of the evaluation of the hydrogen storage capacity; and
  carbonizing a raw material containing, as the organic polymer, the candidate polymer used for preparing the selected candidate carbonized material, to thereby produce the carbonized material.

* * * * *